July 22, 1947.　　　H. S. PASTURCZAK　　　2,424,499
CAMERA MOUNTING
Filed Jan. 5, 1945　　　3 Sheets-Sheet 1

INVENTOR.
HARRY. S. PASTURCZAK
BY
Barnett + Gillespie
ATTORNEYS

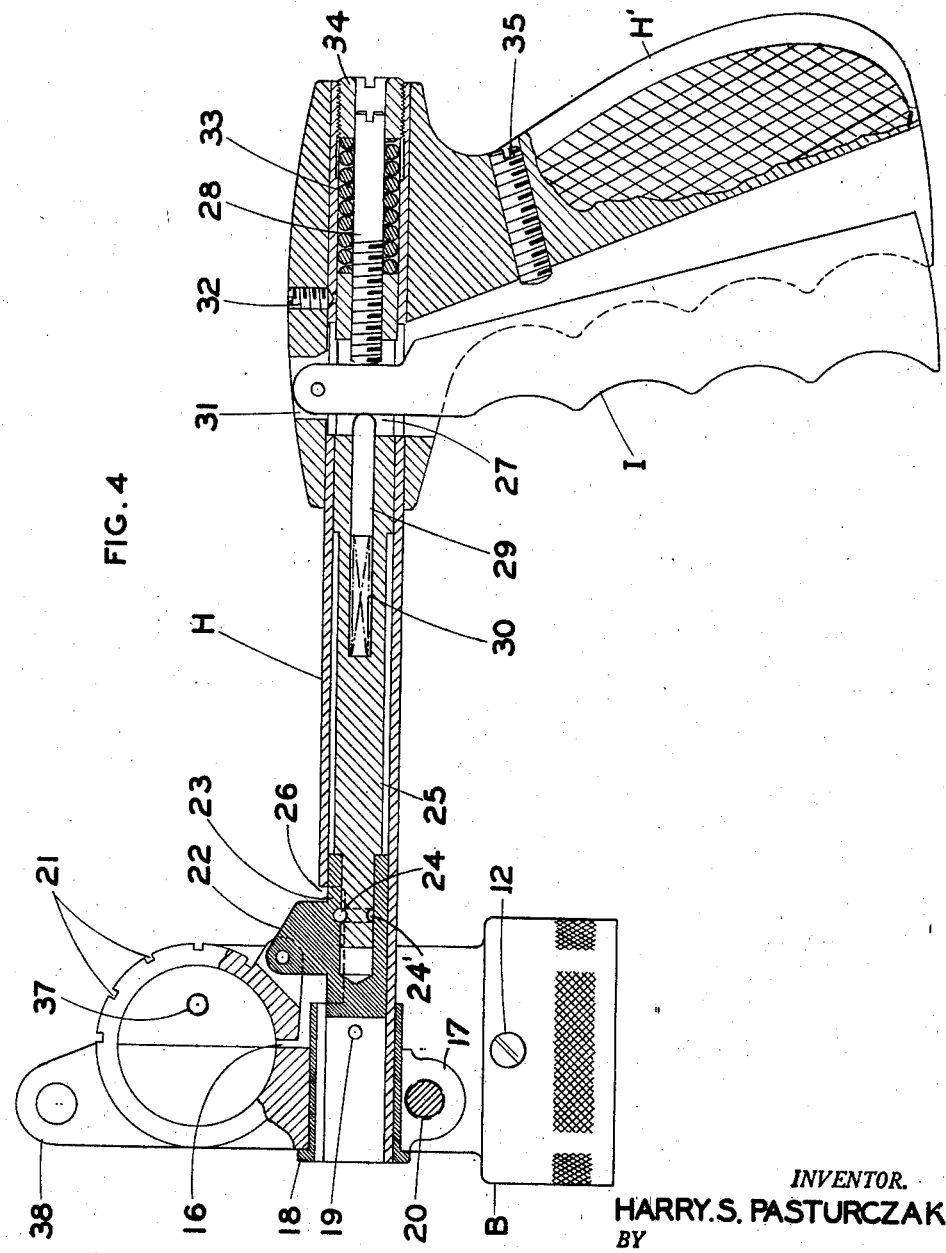

July 22, 1947.  H. S. PASTURCZAK  2,424,499
CAMERA MOUNTING
Filed Jan. 5, 1945  3 Sheets-Sheet 3
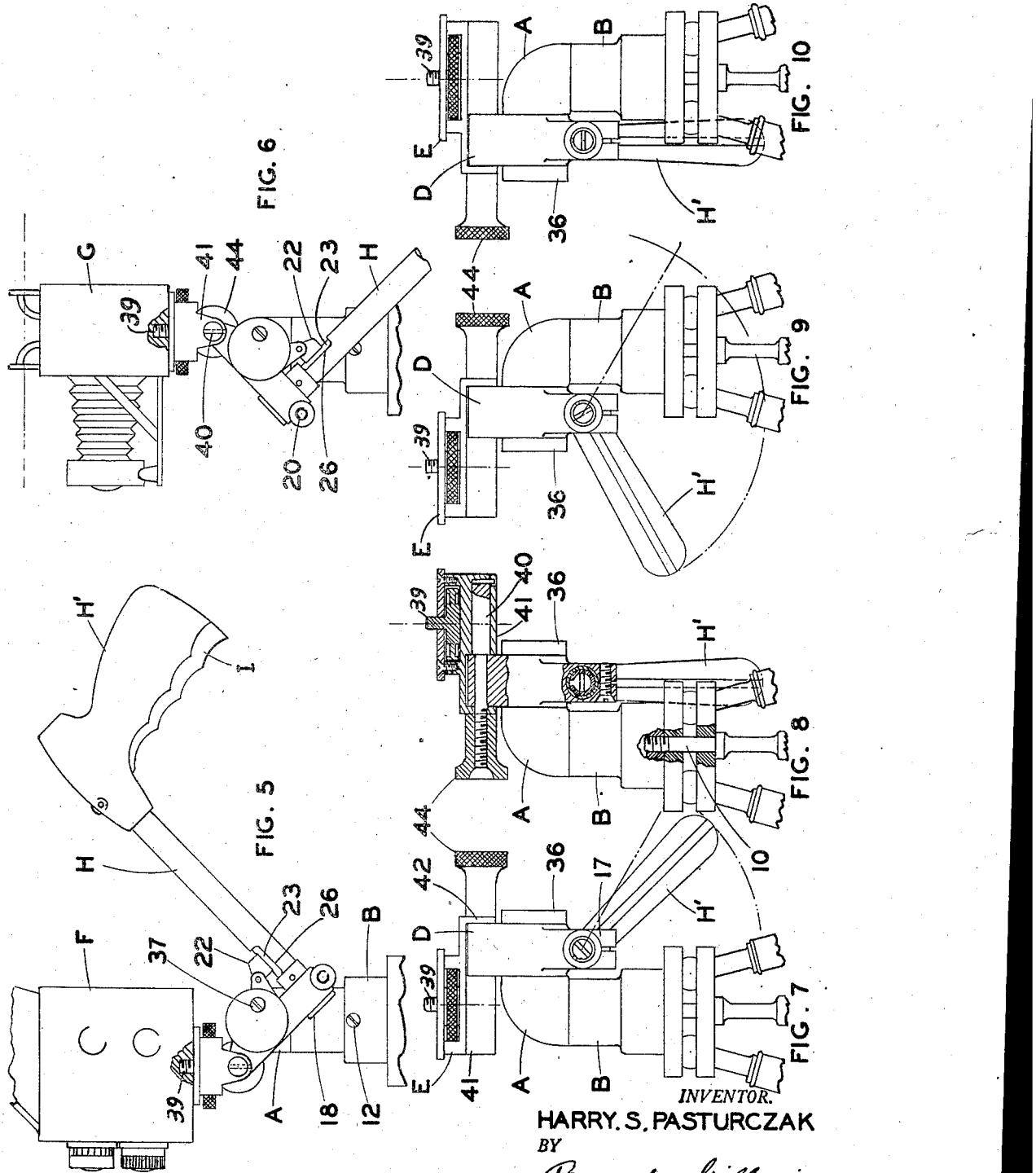
INVENTOR.
HARRY. S. PASTURCZAK
BY
Barnett & Gillespie
ATTORNEYS.

Patented July 22, 1947

2,424,499

UNITED STATES PATENT OFFICE 2,424,499

CAMERA MOUNTING

Harry S. Pasturczak, East Moline, Ill.

Application January 5, 1945, Serial No. 571,476

10 Claims. (Cl. 248—183)

This invention relates to certain new and useful improvements in camera mountings.

A principal object of the invention is to provide a simplified structure for adjustably mounting a camera or other instrument on a tripod or other support so that the mounted element may be accurately and conveniently positioned at any angle desired by the operator.

The invention is directed specifically to an adjustable mounting of the above character which may be simultaneously adjusted about horizontal and vertical axes to various selective positions and includes trigger actuated tension means for holding the mounting in such adjusted positions; the tension means being itself adjustable to accommodate cameras or other instruments of different weights and the trigger means and other parts being adjustable and/or reversible to accommodate right and left hand operation and the general convenience of the operator.

According to the present invention, a split elbow composed of like sections A—A' is supported in a base socket B with capacity for movement about a vertical axis. Horizontal portions C—C' of the elbow sections provide a mounting for a tension member D. The member D is movable to various positions about the said horizontal portions of the elbow. A clamping pad E to which a camera F or G may be fixed (Figs. 5 and 6) is pivotally secured to the tension member D with capacity for manual adjustment about a horizontal axis extending parallel to the horizontal portions C—C' of the split elbow. The position of said clamping pad E may be reversed on the tension member D and the tension member itself may be reversed on the horizontal portions C—C' of the split elbow to meet special operating requirements.

The force exerted by the tension member serves to maintain its adjusted position on the split elbow and also serves to force the lower ends of the elbow sections apart and into frictional holding engagement with the inner walls of the base socket B. This result is obtained by virtue of the fact that the elbow sections C and C' are formed with co-engaging fulcrum bearings G—G', whereby pressure applied at one end of the elbow tending to press the ends of the separate elbow sections together forces the other ends of said sections apart. Consequently, the force exerted by the tension member on the horizontal end portions of the elbow sections forces the other ends outwardly into gripping engagement with the walls of the base socket B so as to hold the split elbow from movement about its vertical axis.

A handle for use in changing the position of the members C—C' and D is rotatably supported in the tension member D so that the shaft portion H of the handle may be readily turned about its longitudinal axis and a pistol hand grip portion H' may be moved to any suitable angle. The handle also includes a trigger mechanism I which, when operated, relieves the force exerted by the tension member D and, therefore, releases the members D and C—C' whereby adjustments of the mounting about vertical and horizontal axes may be made separately or simultaneously.

A further object of the invention is to provide an improved mounting structure constructed and operating in the manner above briefly described.

The invention is illustrated in the accompanying drawings wherein

Fig. 4 is an enlarged longitudinal section taken on line 4—4 of Fig. 1.

Fig. 5 is a view in side elevation, and on a somewhat reduced scale, illustrating the various parts of the mounting adjusted to accommodate a camera of the type in which the operator views the object through the top of the camera.

Fig. 6 illustrates another position of adjustment to accommodate a camera of a different type.

Fig. 7 is a front view in elevation illustrating the reversible clamping pad element of the structure arranged in one position with the operating handle turned to an angular position.

Fig. 8 is a similar view of the adjustable mounting, but illustrating the clamping pad element of the structure in a reverse position relative to the position shown in Fig. 7 and illustrating also the operating handle in a different position; and Figs. 9 and 10 are views similar to Figs. 7 and 8, but illustrating the split elbow of the structure arranged in position which are the reverse to that shown in Figs. 7 and 8.

Figure 3:
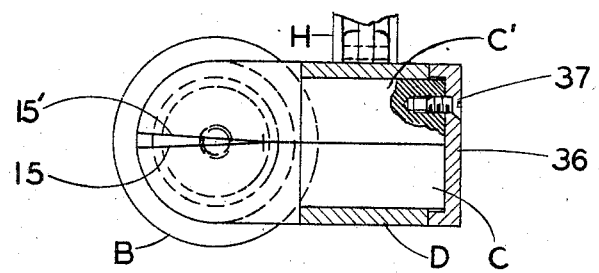
Figs. 2 and 3 are fragmentary sectional views on line 2—2 of Fig. 1, showing the positions assumed by certain of the movable parts of the mounting when it is in its released and in its locked positions, respectively.
Figure 2:
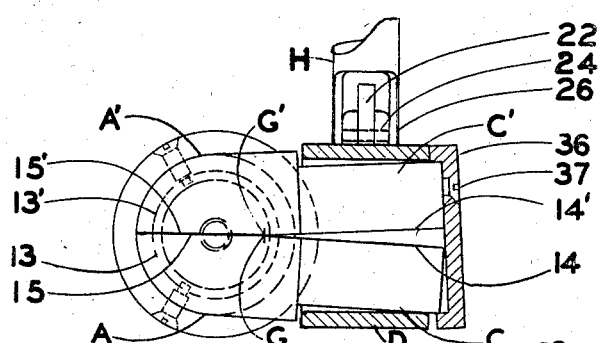
Figure 1:
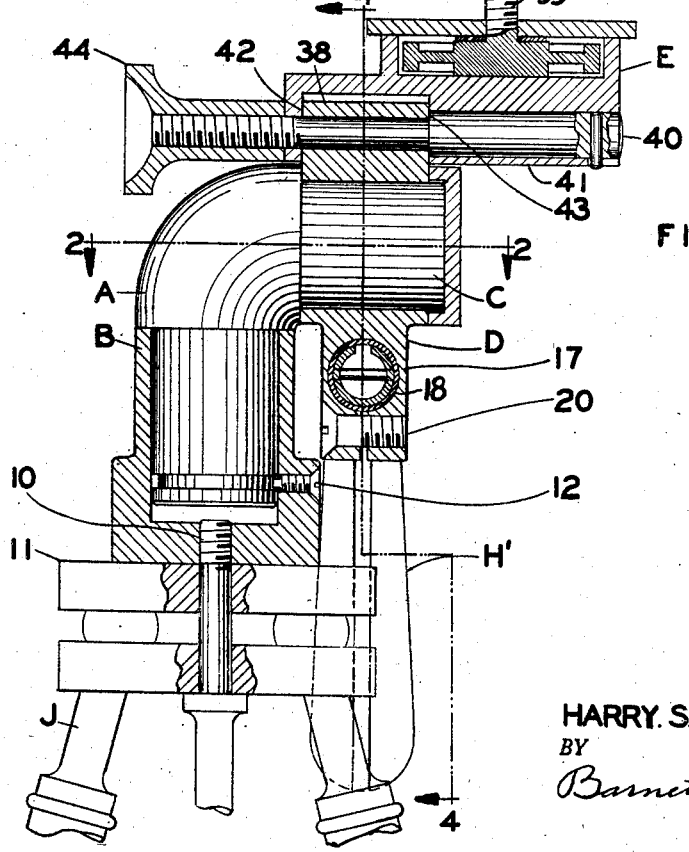
Fig. 1 is a vertical sectional view illustrating the parts in one position of the adjustment.

Referring first to Figs. 1 to 4, inclusive, of the drawings: The base member B is in the form of a cylindrical socket secured by means of the screw 10 to the head portion 11 of a tripod J. The split elbow sections C—C' are arranged to turn about a vertical axis in socket B. The elbow sections are retained in the socket by means of screws 12—12 which extend into grooves 13—13' formed in the lower end portion of the elbow sections. The adjacent faces 14-15 of the elbow sections A and the adjacent corresponding faces 14'—15' of elbow section A' are formed to diverge from the fulcrum points G—G', as shown in Figs. 2 and 3. The said fulcrum points are arranged at one side of the vertical axis of the elbow so that application of pressure tending to move the horizontal arms of the elbow toward each other, for example from the position shown in Fig. 2, to the position shown in Fig. 3, will spread the lower ends of the elbow sections apart and thereby produce a frictional binding action in the socket sufficient to hold the elbow structure from turning movement about its vertical axis. However, when this pressure on the horizontal arms of the elbow structure is relieved, the elbow may be turned freely about its vertical axis in the base socket B.

The tension member D for applying pressure to the horizontal ends of the elbow sections C—C' is in the form of a band, slit transversely at 16 (Fig. 4) so that the band may be expanded and contracted as may be desired. The said tension member is formed at one side of the slit 16 with a depending split bearing 17 in which the shaft portion H of the handle is supported to turn about its longitudinal axis. A bronze sleeve bearing 18 fits over the end of the shaft H and is secured thereto by means of a pin 19. A screw 20 extends through portions of the split bearing 17 to vary the tension on the shank portion of the handle. This tension is preferably such that the pistol type of hand grip H' can be moved freely to any desired angular position and will remain in such position until changed by the operator. The portion of the tension member D at the other side of slit 16 is provided with a series of grooves 21 so this portion of said member will be suitably flexible. The lower end of the grooved portion is connected by means of a fin 22 to a hollow slide 23 which is swiveled by means of a pin groove 24—24' to a pull rod 25. The pull rod extends lengthwise within the tubular shaft H of the handle. One end of the tubular shaft H is slotted at 26 to permit the tube to be fitted over the member 23, and the other end of the trigger I. Preferably the slot 26 is sufficient to permit the tubular shaft H, the hand grip H', and the pull rod 25 to be turned relative to the slide 23. The effective length of the pull rod, and consequently the forward position of trigger I is adjusted by means of screw 28 which is threaded through one end of the pull rod and bears against the rear edge of trigger I. A pin 29 mounted in a central bore of the pull rod is pressed against the opposite face of the trigger by means of a spring 30. The compression of spring 30 holds the trigger I firmly against the adjusting screw 28. The pull rod 25 is moved rearwardly to relieve the compression of the tension member D on the elbow sections C—C'. This movement is effected by a squeezing grip of the operator on the hand grip H' and trigger I. The trigger is preferably pivoted at its upper end in a slot 31 formed in the hand grip member, the latter of which is fixed to one end of the tubular shaft H by means of a set screw 32. The pull rod is forced by means of a spring 33 in a direction to cause the tension member D to grip the horizontal portion of the elbow. The compression of the spring 33 may be adjusted by tubular screw 34 to exert varying degrees of pressure on the rod 25 and tension member D and thereby accommodate the camera mounting to cameras of various weights.

An adjustable screw 35 extends through a portion of the hand grip H' and limits the retractive movement of the trigger I.

Returning now to the tension member D: It is preferably secured on the elbow section C—C' by means of a cap 36 which fits over the ends of both sections C—C' of the split elbow. The cap may be fixed to one of the elbow sections by means of a screw 37. The upper portion of the tension member D is provided with a lug 38 to which is pivotally secured the reversible clamping pad E. The said pad is provided with a clamp screw 39 for engaging a camera or other instrument to be supported and is secured to the tension member D with capacity for angular adjustment about a horizontal axis. This horizontal axis coincides with the longitudinal axis of a clamping bolt 40 which extends through lugs 41 and 42 formed on the clamping pad E and the lug 38 on tension member D. The clamping effect of bolt 40 is obtained by virtue of a shoulder 43 which engages one of the end faces of lug 38 and a hand tightening nut 44 engaging the threaded end of the bolt 40 and bearing against the outer face of lug 42.

From the above description it will be seen that I have provided an adjustable mounting capable of assuming various angular positions and which can be adjusted to a minute degree about vertical and horizontal axes and locked in such positions by means of a tension lock releasable by trigger action. For example, the portion E, referred to herein as a clamping pad, may be adjusted about the longitudinal axis of the bolt 40 by merely loosening the knurled hand nut 44 and moving the member E to any desired position. If a camera of the type shown in Fig. 5 of the drawing is clamped to the pad E, the clamping pad may be so positioned as to hold the camera at the desired horizontal level and to permit the handle H to extend upwardly at a convenient angle to facilitate operation of the camera while the operator inspects the view by looking downwardly into the top portion of the camera. If the camera is of the general type shown in Fig. 6, the clamping pad E may be adjusted to such position that the handle H will extend downwardly, as shown, or at any suitable position. In either case, the camera may be moved about vertical and horizontal axes to any position of minute adjustment and locked in that position. In order to effect these adjusting movements, the operator merely squeezes the trigger I into the pistol type of hand grip H'. This movement of the trigger moves the pull rod 25 outwardly and flexes the tension member D to relieve its pressure on the horizontal end portion of elbow sections C—C'. By releasing the pressure on the said horizontal end portions of the elbow, the lower ends of the said elbow sections are released from their binding engagement in the base socket B of the camera mounting. When the camera or other instrument being supported has been adjusted about said vertical and horizontal axes to a desired position, the trigger is released, whereby the spring 33 forces the pull rod 25 in a reverse direction and thereby exerts pressure through the tension member E on the elbow sections to lock the movable parts in their adjusted positions.

In order to facilitate convenient operation of the adjustable mounting, the handle shaft H and the hand grip H' may be changed to any desired angular position to accommodate either right hand or left hand operation as shown in Figs. 7 to 10, inclusive. The clamping pad may be assembled so that the vertical center of the instrument being supported will coincide with the vertical axis of the mounting as shown in Fig. 7, or it may be mounted in a reversed position as shown in Fig. 8 so that the vertical center of the supported instrument will be located at one side of the vertical center of the elbow sections. Further alternative assemblies of the parts of the invention are illustrated in Figs. 9 and 10 in which the elbow sections are arranged in positions reverse to that shown in Figs. 7 and 8, and the tension member E and the handle H are arranged on the opposite side of the vertical center of the elbow relative to the positions shown in Figs. 7 and 8.

I claim:

1. An instrument mounting comprising a member movable about a vertical axis, a supporting member carried thereon and movable about a horizontal axis, a handle for effecting said vertical and horizontal movements including an outwardly extending shaft rotatably engaging one of said members, whereby the handle may be adjusted to various angular positions about the longitudinal axis of said shaft independently of the first mentioned adjustments, and tension means operatively associated with said handle and made effective and ineffective thereby to simultaneously lock the said mounting in any desired position of adjustment.

2. An instrument mounting comprising an elbow member movable about a vertical axis, a supporting member carried thereon and movable about a horizontal axis, a handle for effecting said vertical and horizontal movements including an outwardly extending shaft having a pistol type hand grip thereon and rotatably engaging one of said members, whereby the hand grip may be adjusted laterally to various angular positions by said rotational movement of said shaft without affecting the first mentioned adjustments, and tension means operatively associated with said handle and made effective and ineffective thereby to simultaneously lock the said mounting in any desired position of adjustment.

3. An instrument mounting comprising a split elbow member in which the parts are formed with cooperating fulcrum bearings intermediate their ends to permit rocking movement of the elbow sections relative to each other, a socket member in which the elbow sections are movable about a vertical axis, an instrument supporting member carried on the split elbow member and movable about a horizontal axis, a handle for effecting said vertical and horizontal movements including an outwardly extending shaft having a pistol type hand grip thereon and rotatably engaging one of said members, whereby the hand grip may be adjusted laterally to various angular positions independently of the first mentioned adjustments, and tension means associated with said handle for simultaneously locking the said mounting in any desired position of adjustment.

4. An instrument mounting comprising a socket, a spindle revoluble in said socket about its longitudinal axis and including a split elbow member one arm of which is movable into and out of binding engagement with said socket, means for supporting an instrument on the other arm of said elbow including a tension member for gripping said elbow, an operating handle for shifting said elbow and said supporting means to various selected position, and trigger means for controlling the grip of said tension member on said elbow.

5. An instrument mounting comprising a socket, a spindle in the form of an elbow revoluble in said socket about a longitudinal axis and split lengthwise to provide two sections, a rocker bearing on one of said sections, whereby application of pressure to press one of its ends toward the adjacent section moves its other end outwardly from said section, means for supporting an instrument on said elbow with capacity for adjusting movements relative to said elbow.

6. An instrument mounting comprising a socket, a spindle split in the direction of its length and revoluble in said socket about a longitudinal axis, one of said sections of said spindle being formed with a rocker bearing engaging the other section at a location intermediate its ends, whereby pressure applied laterally to one end portion of the spindle moves the other end portions of its sections into binding engagement with the walls of the socket, a tension member engaging one end of the spindle for rocking the sections thereof into said binding engagement in the socket, means for adjustably supporting an instrument on said tension member, a handle engaging the tension member for adjustably positioning the spindle and said tension member, and trigger means associated with the handle for releasing the grip of said tension member on the spindle whereby the spindle is released from its binding engagement in said socket.

7. An adjustable mounting for supporting an instrument with capacity for adjustment about vertical and horizontal axes, a socket member, a spindle in the form of a split elbow having its lower end rotatably supported in said socket, means providing a pivot bearing between the sections of said split elbow, a tension member mounted on the elbow and adapted to exert tilting pressure on said sections to force said lower ends into binding engagement with the walls of said socket and movable to various positions about said horizontal axis, means for mounting an instrument on said tension member, a handle for moving said elbow and said tension member to various positions, and a trigger device associated with the handle for relieving the pressure of said tension device on the elbow member.

8. An adjustable mounting for supporting an instrument with capacity for adjustment about vertical and horizontal axes, a socket member, a spindle in the form of a split elbow having its lower end rotatably supported in said socket, means providing a pivot bearing between the sections of said split elbow, a tension member mounted on the elbow and adapted to exert tilting pressure on said sections to force said lower ends into binding engagement with the walls of said socket, and movable to various positions about said horizontal axis, means for mounting an instrument on said tension member comprising a clamping pad adjustable relative to said tension member about a horizontal axis, a handle for moving said elbow and said tension member to various positions, a trigger device associated with the handle for relieving the pressure of said tension device on the elbow member, and including a variable compression spring for exerting pressure through said tension member on the sections of said elbow to lock the parts in fixed position.

9. An instrument mounting for supporting an instrument with capacity for adjustment about vertical and horizontal axes, a socket member, a spindle in the form of a split elbow having its lower end rotatably supported in said socket, means providing a pivot bearing between the sections of said split elbow, a reversible tension member mounted on the elbow and adapted to exert tilting pressure on said sections to force said lower ends into binding engagement with the walls of said socket and movable to various positions about said horizontal axis, means reversibly engaged on said tension member for mounting an instrument thereon selectively in alignment with the vertical axis of said elbow or at one side of said axis comprising a clamping pad adjustable relative to the tension member about a horizontal axis, means for moving said elbow and said tension member to various positions, a trigger device associated with the handle for relieving the pressure of said tension device on the elbow member, and including a variable compression spring for exerting pressure through said tension member on the sections of said elbow to lock the parts in fixed position.

10. An instrument mounting for supporting an instrument with capacity for adjustment about vertical and horizontal axes, a socket member, a spindle in the form of a split elbow having its lower end rotatably supported in said socket, means providing a pivot bearing between the sections of said split elbow, a reversible tension member mounted on the elbow and adapted to exert tilting pressure on said sections to force said lower ends into binding engagement with the walls of said socket and movable to various positions about said horizontal axis, means reversibly engaged on said tension member for mounting an instrument thereon selectively in alignment with the vertical axis of said elbow or at one side of said axis comprising a clamping pad adjustable relative to the tension member about a horizontal axis, means for moving said elbow and said tension member to various positions including a horizontal shaft and a pistol form of hand grip thereon, a tension clamp for mounting the handle on said tension member with capacity for adjustment to various angular positions about the axis of said shaft, a trigger device associated with the handle for relieving the pressure of said tension device on the elbow member, and including a variable compression spring for exerting pressure through said tension member on the sections of said elbow to lock the parts in fixed position.

HARRY S. PASTURCZAK.

REFERENCES CITED

The following references are of record in the file of this patent:

UNITED STATES PATENTS

| Number | Name | Date |
| --- | --- | --- |
| 1,854,951 | Neuwirth | Apr. 19, 1932 |
| 1,919,554 | Howell | July 25, 1933 |
| 2,143,606 | Mooney | Jan. 10, 1939 |
| 2,226,827 | Moore | Dec. 31, 1940 |
| 2,318,633 | Ries | May 11, 1943 |
| 2,318,910 | Zucker | May 11, 1943 |
| 2,374,282 | Gross | Apr. 24, 1945 |